(12) United States Patent
Johnson et al.

(10) Patent No.: US 10,543,649 B2
(45) Date of Patent: Jan. 28, 2020

(54) CUTTING MECHANISM

(71) Applicant: ROLLS-ROYCE PLC, London (GB)

(72) Inventors: Anthony Dale Johnson, Conowingo, MD (US); Ralph Douglas Cope, Elkton, MD (US); John Anthony Kukon, Franklinville, NY (US); Michael James Case, Newark, DE (US); James Tingle, Easr Cowes (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 15/975,457

(22) Filed: May 9, 2018

(65) Prior Publication Data
US 2018/0257319 A1 Sep. 13, 2018

Related U.S. Application Data

(63) Continuation of application No. 14/733,480, filed on Jun. 8, 2015, now Pat. No. 9,993,981, which is a (Continued)

(51) Int. Cl.
 *B29C 70/54* (2006.01)
 *B26D 1/12* (2006.01)
 (Continued)

(52) U.S. Cl.
 CPC ............ *B29C 70/545* (2013.01); *B26D 1/125* (2013.01); *B26D 7/0683* (2013.01); (Continued)

(58) Field of Classification Search
 CPC ... B29C 70/545; B29C 70/384; B29C 70/388; B29C 70/386; B29D 1/015; (Continued)

(56) References Cited

U.S. PATENT DOCUMENTS 5,045,147 A * 9/1991 Benson .................. B29C 53/58
 156/429
5,110,395 A 5/1992 Vaniglia
 (Continued)

FOREIGN PATENT DOCUMENTS

EP 2324994 A1 5/2011
JP 2008521656 A 6/2008
 (Continued)

OTHER PUBLICATIONS

Intellectual Property Office of Great Britain, "Search Report," issued in connection with application No. GB1320989.5, dated Mar. 10, 2014, 3 pages.
 (Continued)

*Primary Examiner* — Ghassem Alie
(74) *Attorney, Agent, or Firm* — Banner & Witcoff, Ltd.

(57) ABSTRACT

There is disclosed a cutting mechanism for severing elongate fibre reinforcement material in composite material lay-up equipment, the cutting mechanism comprising a cutting element and a counteracting element which cooperate to sever fibre reinforcement material extending through the nip between them, the cutting element being mounted on an elongate arm which is pivotable about a pivot axis A spaced from the nip, to displace the cutting element relatively to the counteracting element to perform a cutting stroke, the mechanism further comprising guide means arranged to guide the fibre reinforcement material through the nip in a feed direction transverse to the pivot axis A, and an actuation device for driving the elongate arm in a cutting stroke, the actuation device acting on the elongate arm at a position away from the cutting element. There is also provided composite material lay-up equipment comprising the cutting mechanism.

12 Claims, 12 Drawing Sheets

Related U.S. Application Data continuation of application No. 13/839,511, filed on Mar. 15, 2013, now Pat. No. 9,149,949.

(51) Int. Cl.

| | | |
|---|---|---|
| *B26D 7/06* | (2006.01) | |
| *B29C 70/38* | (2006.01) | |
| *B26D 1/01* | (2006.01) | |
| *B29K 105/08* | (2006.01) | |
| *B29K 307/04* | (2006.01) | |
| *B29K 63/00* | (2006.01) | |

(52) U.S. Cl.
CPC .......... *B29C 70/384* (2013.01); *B29C 70/386* (2013.01); *B29C 70/388* (2013.01); *B26D 1/015* (2013.01); *B29K 2063/00* (2013.01); *B29K 2105/0881* (2013.01); *B29K 2307/04* (2013.01); *Y10T 29/5148* (2015.01); *Y10T 83/727* (2015.04); *Y10T 83/8798* (2015.04); *Y10T 83/8799* (2015.04); *Y10T 156/1085* (2015.01); *Y10T 156/1097* (2015.01); *Y10T 156/125* (2015.01); *Y10T 156/13* (2015.01); *Y10T 156/1788* (2015.01); *Y10T 156/18* (2015.01)

(58) Field of Classification Search
CPC ........ B29K 2015/0881; B29K 2063/00; B29K 2307/04; B26D 7/0683; B26D 1/125; Y10T 83/0881; Y10T 156/18; Y10T 156/13; Y10T 156/1097; Y10T 156/81085; Y10T 29/5148; Y10T 83/7799; Y10T 156/1788; Y10T 156/125; Y10T 83/727; Y10T 156/1348
USPC ..... 83/354; 425/102, 90; 156/353, 175, 425, 156/433, 441, 523, 574, 351, 361, 499, 156/511, 512, 36, 5, 497, 495, 517, 560, 156/359

See application file for complete search history.

(56) References Cited

U.S. PATENT DOCUMENTS

| | | | |
|---|---|---|---|
| 5,979,531 A | 11/1999 | Barr et al. | |
| 9,481,158 B2* | 11/2016 | Horst | .................... B29C 70/384 |
| 2006/0118244 A1* | 6/2006 | Zaballos | ................ B26D 1/085 |
| | | | 156/510 |
| 2008/0216961 A1 | 9/2008 | Hamlyn et al. | |
| 2008/0302483 A1 | 12/2008 | Vaniglia | |
| 2009/0211698 A1* | 8/2009 | McCowin | ............. B29C 70/386 |
| | | | 156/250 |
| 2010/0276087 A1 | 11/2010 | Weinman et al. | |
| 2011/0117231 A1* | 5/2011 | Klockow | ................ B29B 13/04 |
| | | | 425/102 |
| 2011/0309543 A1 | 12/2011 | Beraud et al. | |
| 2012/0227560 A1 | 9/2012 | DeVlieg et al. | |

FOREIGN PATENT DOCUMENTS

| | | |
|---|---|---|
| JP | 2009504425 A | 2/2009 |
| JP | 2011508708 A | 3/2011 |
| WO | 2009052158 A1 | 4/2009 |
| WO | 2010070245 A1 | 6/2010 |

OTHER PUBLICATIONS

International Searching Authority, "International Search Report and Written Opinion," issued in connection with international application serial No. PCT/GB2014/050818, dated Sep. 3, 2014, 15 pages.
Nov. 2, 2016—CN Office Action—App. No. 201480027926.8—18 pages.
Nov. 6, 2018—JP Office Action—App 2015-562334, with translation.

* cited by examiner

CUTTING MECHANISM

RELATED APPLICATIONS

This application is a continuation of U.S. patent application Ser. No. 14/733,480, filed Jun. 8, 2015, which is a continuation of U.S. patent application Ser. No. 13/839,511, filed Mar. 15, 2013, issued as U.S. Pat. No. 9,149,949. The contents of which are hereby incorporated by reference in its entirety.

BACKGROUND

The invention relates to a cutting mechanism for severing elongate fibre reinforcement material in composite material lay-up equipment.

Fibre composite components are frequently used for applications requiring a combination of light weight and strength, for example in sports equipment and in aerospace components. Most fibre composite manufacturing processes require successive layers of fibre reinforcement material to be applied to an article or a mould in a lay-up process. A matrix material is either pre-applied to the fibre reinforcement material (pre-impregnated, or "pre-preg") or is subsequently applied to the reinforcement material before curing in or out of an autoclave. Recent manufacturing developments have allowed the lay-up process to be performed automatically.

Three exemplary automatic composite manufacturing processes are Automatic Tape Laying (ATL), Automatic Fibre Placement (AFP) and automatic filament winding. Briefly, ATL relates to the application of a tape comprising fibre reinforcement material to an article. The tape typically comprises unidirectional fibres which are pre-impregnated with matrix material (e.g. epoxy resin). Successive tape layers are typically applied at different orientations from one another to form a ply structure. The tape is typically applied to the article by an applicator roller.

In AFP, the fibre reinforcement material is applied to an article in the form of a "tow", comprising a plurality of individual fibres, or multiple "tows". A "tow" may be a narrow width of tape slit from a wider tape. AFP is typically more suitable for complex parts having a higher degree of curvature or non-uniform curvature. The fibres are typically pre-impregnated with matrix material or drawn through a bath of matrix material. A course or series of "tows" is typically applied to the article by an applicator roller.

Automatic filament winding differs from AFP in that the article typically functions as a rotating mandrel and the lay-up equipment typically traverses the mandrel to apply a tow of fibres in tension over the mandrel surface. The angle at which the tow is laid over the mandrel can be adjusted between successive passes of the mandrel such that successive layers lie at different orientations from one another to form a ply structure and to influence the properties of the component (e.g. improved compressive or tensile strength of the manufactured component). The tow of fibres is typically applied to the article by virtue of tensile forces in the tow between the mandrel and an applicator roller of the lay-up equipment.

In all of the above processes it is necessary to sever (or cut) the tow or tape of fibre reinforcement material (whether pre-impregnated or not) at the end of the process, or at the end of a stage in the process.

However, the cutting mechanisms used in known composite lay-up equipment are bulky, which causes the equipment to be bulky at the tip region. A bulky tip region may limit the complexity of the articles to which fibre reinforcement material can be applied by the equipment, since it may not be possible to manipulate the tip region over high curvature or other hard-to-access parts of the article.

It is therefore desirable to provide improved composite lay-up equipment which is less bulky in the tip region and to provide an improved cutting mechanism for use with the equipment.

SUMMARY

According to an aspect of the invention there is provided a cutting mechanism for severing elongate fibre reinforcement material in composite material lay-up equipment, the cutting mechanism comprising a cutting element and a counteracting element which cooperate to sever fibre reinforcement material extending through the nip between them, the cutting element being mounted on an elongate arm which is pivotable about a pivot axis spaced from the nip, to displace the cutting element relatively to the counteracting element to perform a cutting stroke, the mechanism further comprising guide means arranged to guide the fibre reinforcement material through the nip in a feed direction transverse to the pivot axis, and an actuation device for driving the elongate arm in a cutting stroke, the actuation device acting on the elongate arm at a position away from the cutting element.

The actuation device may act on the elongate arm on one side of the pivot axis, and the cutting element may be mounted on the elongate arm on the opposite side of the pivot axis. In configurations in which the pivot axis is offset from the elongate arm, the position of the pivot axis is considered to be the normal projection of the pivot axis onto the elongate arm.

The elongate arm may extend in a plane substantially perpendicular to the pivot axis. The guide means may be arranged to guide the fibre reinforcement material along a guide path extending in a plane substantially perpendicular to the pivot axis, and which may extend along the elongate arm.

The guide means may comprise a guide channel having an outlet adjacent the nip. The guide channel may be formed in the elongate arm. The guide channel may be an enclosed channel over at least part of its length, in which case the outlet may be a slot. The guide channel may be provided with a removable cover which may be pivotable at one end.

The cutting element may be situated such that a cutting edge of the cutting element is disposed at an end of the channel. The elongate arm may comprise a slot for receiving the first cutting element. The cutting edge of the cutting element may provide a lip of the outlet. The cutting element may have a guide face flush with a surface of the channel which terminates at the cutting edge of the cutting element.

The cutting element may be removably mounted on the elongate arm so as to be replaceable. The cutting element may comprise a hardened material.

The cutting element and the counteracting element may be arranged such that a cut formed in the fibre reinforcement material by a cutting stroke extends transversely of the elongate fibre composite material and/or substantially parallel to the pivot axis.

The cutting element and the counteracting element may be arranged such that fibre reinforcement material can pass between them in a direction perpendicular to a plane containing the pivot axis.

The cutting element and the counteracting element may have respective cutting edges which are inclined relative to each other such that in a cutting stroke the cutting element and the counteracting element cooperate in a scissor action. The cutting element and the counteracting element may have opposing cutting edges.

The cutting element and the counteracting element may have respective cutting edges, and the cutting edge of the counteracting element may touch the arcuate path followed by the cutting edge of the cutting element in a cutting stroke.

The elongate arm may be mounted to a structural support for pivotable movement about the pivot axis, the pivot axis being fixed relative to the structural support.

The cutting element may be one of a plurality of cutting elements disposed in an array and there may be at least one counteracting element, each cutting element cooperating with the counteracting element or with one of the counteracting elements to sever a respective length of fibre reinforcement material extending through a respective nip between the cutting element and the respective counteracting element. Each cutting element may be mounted on one of a corresponding plurality of elongate arms which is pivotable about a pivot axis spaced from the nip, to displace the cutting element relatively to the, or the respective, counteracting element to perform a cutting stroke. The guide means may be arranged to guide the fibre reinforcement material through the nips in the feed direction which may be transverse to the or each pivot axis. There may be at least one actuation device for driving the elongate arms in respective cutting strokes, and the or each actuation device may act on the elongate arms at positions away from the respective cutting elements.

The pivot axes of the array of elongate arms may be substantially parallel to one another. The pivot axes of the array of elongate arms may be substantially coincident with each other.

The array may be one of at least two arrays disposed on opposite sides of a plane extending through the pivot axis.

The elongate arms of the or each array may be arranged substantially side-by-side to form a row. There may be at least two rows of elongate arms and the elongate arms of each row may be arranged substantially side-by-side. There may be two arrays of elongate arms which may converge towards the distal end of the cutting mechanism.

At least one actuation device may be coupled to two or more elongate arms so as to drive them in unison. Each actuation device may act on a single elongate arm. There may be a plurality of the actuation devices, which may be operable independently of one another.

At least one counteracting element may be arranged to cooperate with at least two different cutting elements. Each counteracting element may be arranged to cooperate with a single cutting element.

According to an aspect of the invention there is provided a cutting mechanism for severing elongate fibre reinforcement material in composite material lay-up equipment, the cutting mechanism comprising a plurality of cutting elements and at least one counteracting element, each cutting element cooperating with the counteracting element or with one of the counteracting elements to sever a respective length of fibre reinforcement material extending through a respective nip between the cutting element and the respective counteracting element, each cutting element being mounted on a respective elongate arm which is pivotable about a pivot axis spaced from the nip, to displace the cutting element relatively to the respective counteracting element to perform a cutting stroke, the mechanism further comprising guide means arranged to guide the fibre reinforcement material through the nips in a feed direction transverse to the or each pivot axis, and at least one actuation device for driving the elongate arms in respective cutting strokes, the or each actuation device acting on the elongate arms at positions away from the respective cutting elements.

According to an aspect of the invention there is provided composite material lay-up equipment for applying lengths of elongate fibre reinforcement material to an article, the equipment comprising a cutting mechanism in accordance with any statement herein and a support head which carries the cutting mechanism.

The actuation device may be mounted to the support head. The actuation device may act between the support head and the elongate arm. The actuation device may be disposed substantially inboard of the proximal end of the support structure.

The actuation device may comprise a linear actuator having a driven element and a base element, and the actuation device may be operable to move the driven element linearly with respect to the base element. The base element may be coupled to the support head and the driven element may be coupled to the elongate arm.

The base element and/or the driven element may be disposed substantially inboard of the proximal end of the support structure.

The actuation device may be coupled with and may act on the elongate arm via a mechanical linkage.

The mechanical linkage may include a bell crank acting between the actuation device and the elongate arm. The bell crank may have arms of unequal length, for example to provide a mechanical advantage. The bell crank may have a mechanical advantage greater than unity.

At least some of the actuation devices may be arranged in pairs such that the actuation devices of each pair are staggered with respect to each other. The first actuation device of the pair may be offset with respect to the second in a direction towards the proximal end of the support head, and the first actuation device may be provided with an extended arm for connecting to the respective mechanical linkage.

The equipment may extend in a generally longitudinal application direction from an actuation region where the actuation device is mounted to the support head to a tip region where lengths of fibre reinforcement material are cut and applied to the article. The actuation region may be longitudinally spaced from the tip region. The cross-sectional profile of the equipment in a plane normal to the application direction may be smaller at the tip region than at the actuation region.

The support head may be moveable in at least one translational direction. The support head may be configured to rotate about a longitudinal rotation axis.

According to an aspect of the invention there is provided composite material lay-up equipment for applying a plurality of individual lengths of elongate fibre reinforcement material to an article, the equipment comprising: a support head; a cutting mechanism carried by the support head for severing a plurality of individual lengths of elongate fibre reinforcement material, the cutting mechanism comprising: a plurality of cutting elements coupled to and moveable with respect to the support head; and a cassette removably attached to the support head and having a plurality of corresponding counteracting elements statically mounted thereto; wherein each cutting element is displaceable relative to the corresponding counteracting element to perform a cutting stroke in which the respective cutting and counteracting elements cooperate to sever a length of elongate fibre reinforcement material extending through the nip formed between them. By "statically" it is meant that in use the counteracting elements do not move to perform a cutting stroke.

The counteracting elements may be removably mounted to the cassette.

The cutting elements may be composed of a harder material than the counteracting elements.

The cassette may comprise a plurality of guide ducts. Each counteracting element may be disposed adjacent to a respective guide duct and may be arranged to guide the fibre reinforcement material away from the nip between the counteracting element and the corresponding cutting element.

Each guide duct may have a profile which tapers from a duct inlet opening to a duct outlet opening.

The cassette may comprise an exit guide roller arranged to guide the individual lengths of fibre reinforcement material away from the cassette.

Each counteracting element may have a cutting edge and each cutting element may have a cutting edge. The cutting edge of each cutting element may be inclined relative to the cutting edge of the corresponding counteracting element such that in a cutting stroke the cutting element and the counteracting element cooperate in a scissor action.

The cutting edge of each counteracting element may touch the path followed by the cutting edge of the corresponding cutting element in a cutting stroke.

The counteracting elements may be substantially planar. The cassette may further comprise adjustment means capable of resiliently deflecting the cutting edge of each counteracting element towards the corresponding cutting element. The adjustment means may comprise a plurality of adjustment screws, one for each counteracting element. Each adjustment screw may be turned so as to act on its counteracting element and thereby deflect the cutting edge.

The plurality of counteracting elements may be arranged side-by-side in at least one row. There may be two rows of counteracting elements. The cutting edges of the first row of counteracting elements may face the cutting edges of the second row of counteracting elements. At least two counteracting elements may be mounted to the cassette by a holder which is removably mounted to the cassette. Each of the at least two counteracting elements may be individually removably mounted to the holder. There may be two holders and each row of counteracting elements may correspond to a respective holder.

Each cutting element may be coupled to a separate elongate arm which may be pivotable about a pivot axis. The elongate arms may be arranged to move the cutting elements along an arcuate path during a cutting stroke. The cutting edge of each cutting element may be substantially parallel to the corresponding pivot axis. The cutting edge of each counteracting element may be inclined with respect to the corresponding pivot axis.

The invention may comprise any combination of the features and/or limitations referred to herein, except combinations of such features as are mutually exclusive.

BRIEF DESCRIPTION OF THE DRAWINGS

Embodiments of the invention will now be described, by way of example, with reference to the accompanying drawings, in which.

DETAILED DESCRIPTION

Figure 1:
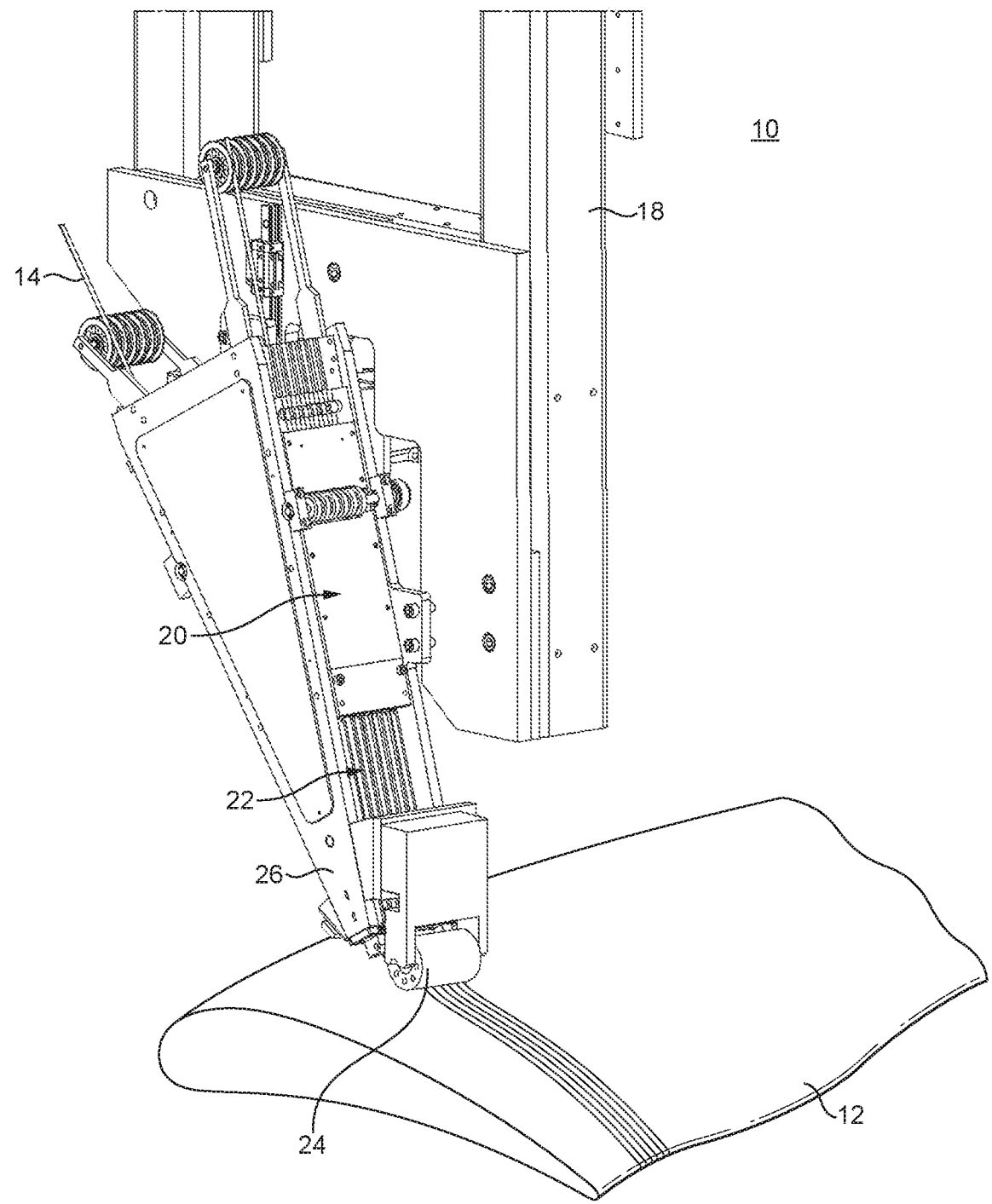
FIG. 1 shows a composite material lay-up machine applying lengths of elongate fibre reinforcement material to an article.

FIG. 1 shows a composite material lay-up machine 10 and a workpiece 12 to which fibre composite material is being applied to form a composite material component, for example an aerospace component such as a wing. As shown in FIG. 1, the machine 10 performs a lay-up process in which fibre composite tows 14 are applied to the workpiece 12. The machine 10 comprises a base or gantry and a manipulation device 18 extending from the base or gantry, the manipulation device 18 supporting a support head 20 which carries a cutting mechanism 22 at its distal end.

In use, the machine 10 feeds several tows 14 through the support head 20 and the cutting mechanism 22 and applies the tows 14 to the workpiece 12 using an applicator roller 24. At the end of an appropriate stage of the lay-up process, the tows 14 are cut by the cutting mechanism 22. In this embodiment the tows 14 are pre-impregnated with matrix material such as epoxy resin, but in other embodiments each tow may comprise fibre reinforcement material only (often referred to as "dry fibre") and matrix material may be added subsequently.

In contrast to previously known lay-up machines, the machine 10 has a compact tip region 26 where the tow 14 is cut and applied to the workpiece 12. The compact tip region 26 enables the machine 10 to lay-up components having complex surface geometry since it can be manipulated over regions of high curvature or other hard-to-access parts of the article, such as narrow recesses. As will be described below, the compact tip region 26 benefits from placing bulkier components, such as actuators, away from the tip region 26, and from the provision of a cutting mechanism 22 that can be actuated remotely from its cutting location.

Figure 2:
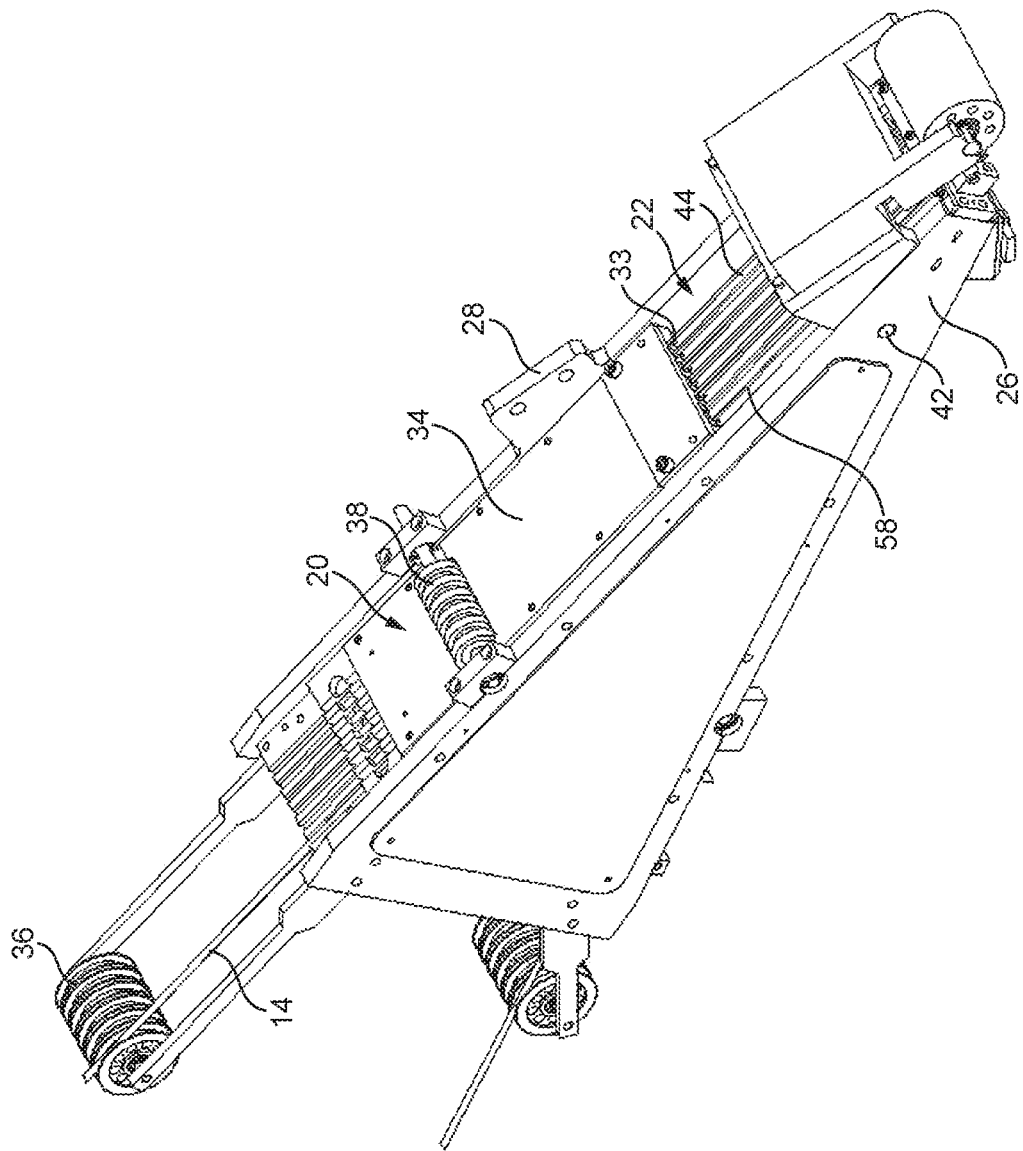
FIG. 2 is a perspective view of a support head and a cutting mechanism of the machine of FIG. 1.
Figure 3:
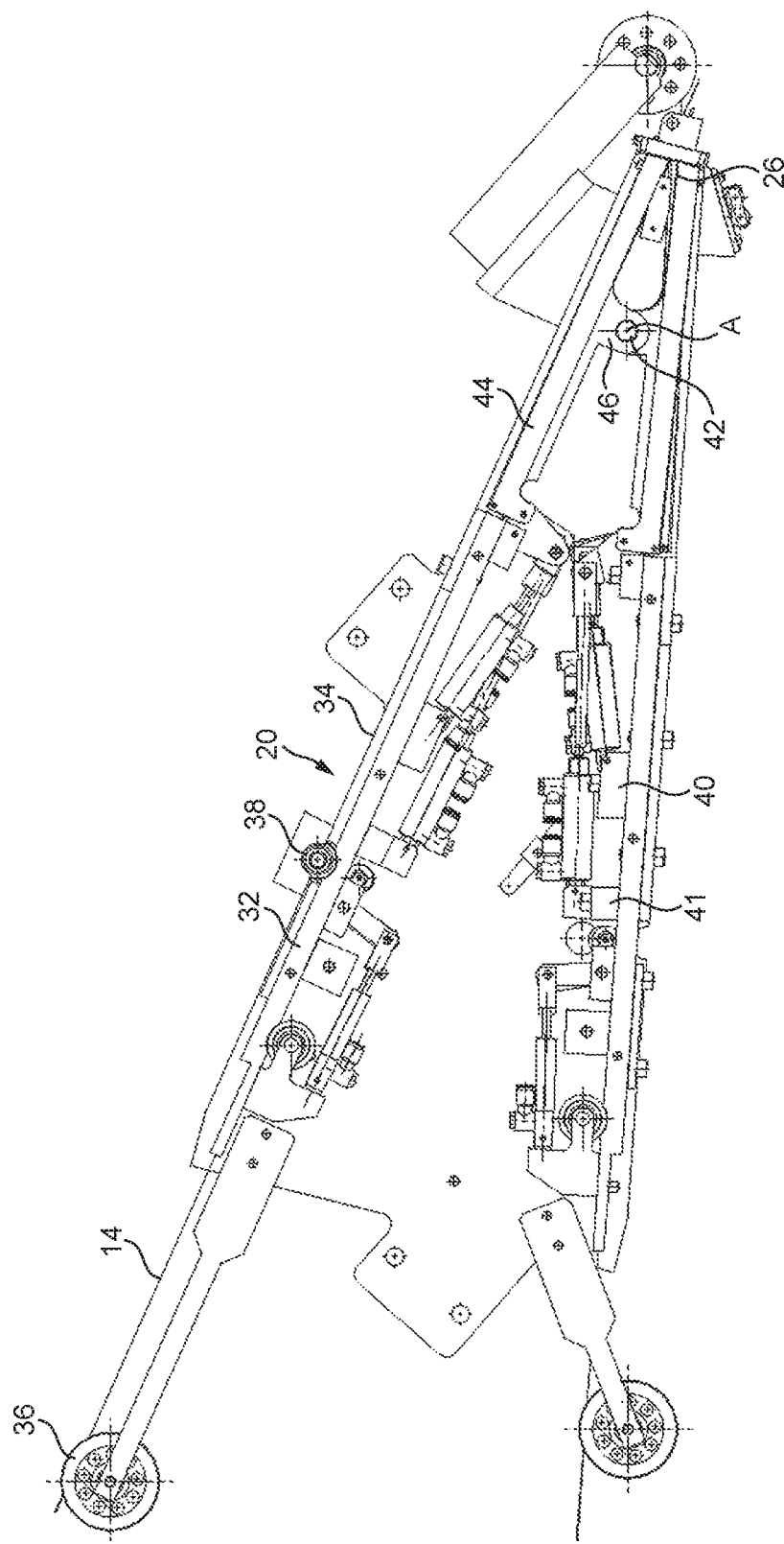
FIG. 3 is a side-view of the support head and cutting mechanism of FIG. 2.
Figure 4:
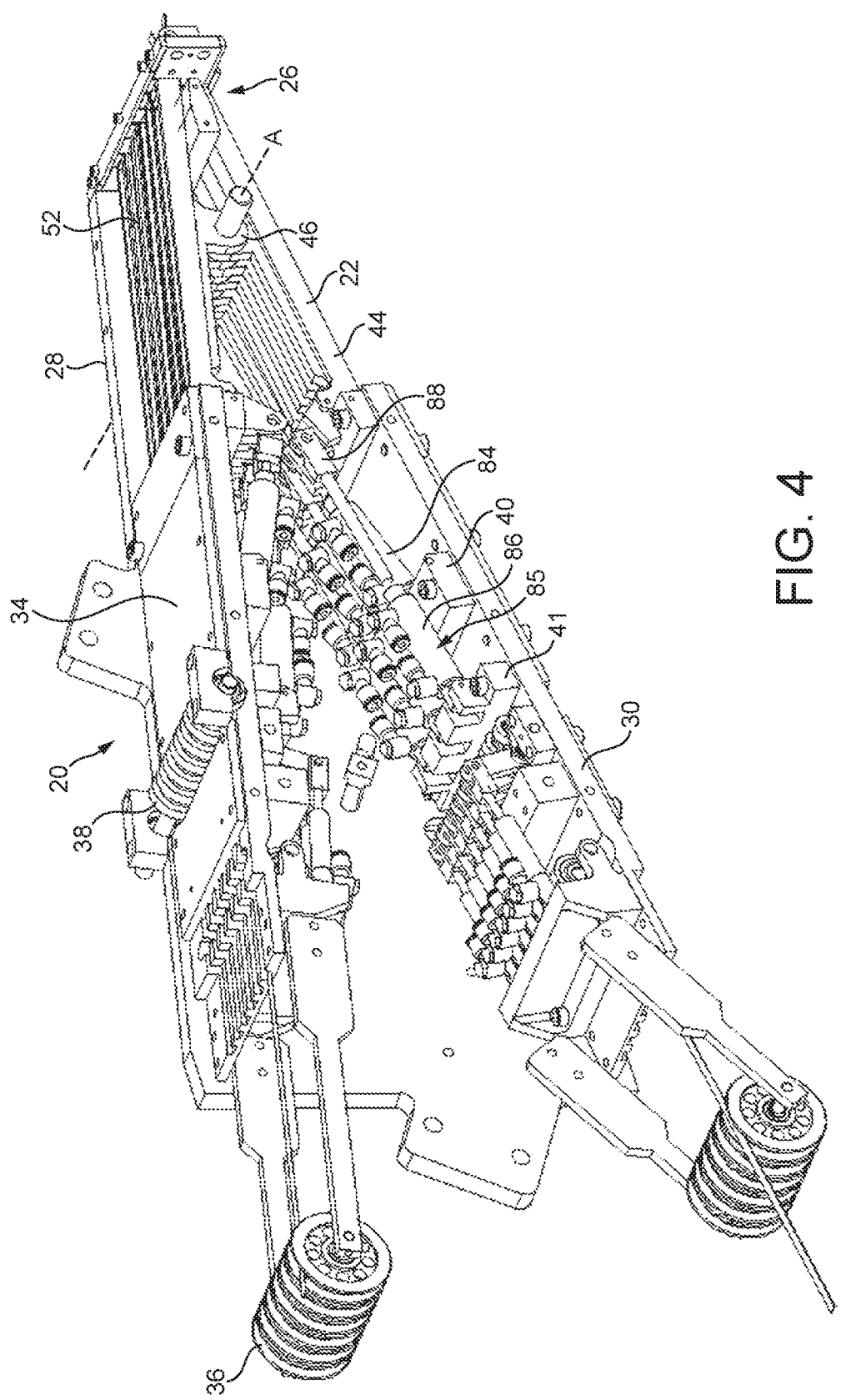
FIG. 4 is a cut-away perspective view of the support head and cutting mechanism of FIG. 2.

As shown in FIGS. 2 to 4, the support head 20 and the cutting mechanism 22 extend in a generally longitudinal application direction from the proximal end of the support head, which in use is attached to the manipulation device 18 (not shown in FIGS. 2 to 4), to the distal tip region 26 of the cutting mechanism 22 where the tow 14 is applied to the workpiece 12 (not shown) and intermittently cut.

The support head 20 comprises two parallel triangular side plates 28 extending from the proximal end of the support head 20 to the tip region 26 of the machine. The side plates 28 are in the shape of an acute isosceles triangle which gives the support head 20 and the cutting mechanism 22 a tapered or converging profile. The support head 20 further comprises upper and lower feed plates 30 supported between the side plates 28, both members 30 being arranged to convey tows 14 along a plurality of adjacent channels 32 towards the cutting mechanism 22. In this embodiment, each feed plate 30 has six adjacent channels 32 each having a feed channel inlet and a feed channel outlet 33. Each feed plate 30 is provided with an outer cover plate 34 which in use encloses the tows 14 in the channels 32.

The feed plates 30 are also provided with conventional tow feeding equipment for feeding the tows 14 into and through the channels 32, which will not be described in detail. Briefly, the feed plates 30 are provided with upper and lower redirecting rollers 36 extending behind the support head and guiding tows 14 into the channels 32, and feed rollers 38 extending through corresponding gaps in the cover plates 34 to drive the tows 14 through the channels 32.

As shown in FIG. 3, the inner side of each feed plate 30 is provided with two rows of three actuator mounting points 40, 41 to which actuators 84, 85 of the cutting mechanism 22 are mounted. As best shown in FIG. 4, the first row of actuator mounting points 40 is longitudinally offset from the second row of actuator mounting points 41, and the respective mounting points of the two rows are alternately laterally offset with respect to one another such that actuators mounted thereto are staggered (note that FIG. 4 shows one representative actuator 84, 85 only for each feed plate 30).

Referring now to FIGS. 3 and 4, the cutting mechanism 22 is disposed adjacent to the distal ends of the two feed plates 30 and between the two tip regions of the triangular side plates 28. The cutting mechanism comprises a pivot axle 42 extending between the two side plates 28 and a plurality of elongate arms 44 mounted on the pivot axle 42 for pivoting movement about a pivot axis A extending transverse to the application direction. The pivot axle 42 slots into corresponding holes provided within the tip regions of the triangular side plates 28.

Each elongate arm 44 is in the form of a channel section having an outwardly facing opening, and has an inwardly extending pivot attachment portion 46 having a transversely extending hole which receives the pivot axle 42. The pivot attachment portion 46 of each arm is approximately half way along the elongate arm, but slightly nearer to the distal end. In this embodiment, there are twelve elongate arms disposed in two arrays in the form of rows: an upper row 46 comprising six elongate arms 44 disposed side-by-side and a lower row comprising the remaining six elongate arms 44 disposed side-by-side. The elongate arms 44 of the two rows are disposed on the pivot axle 42 in alternating sequence, such that the channel sections of the upper and lower arms 44 are laterally offset with respect to each other.

Each elongate arm 44 extends in a direction parallel to a plane which is substantially perpendicular to the pivot axis A.

Figure 5:
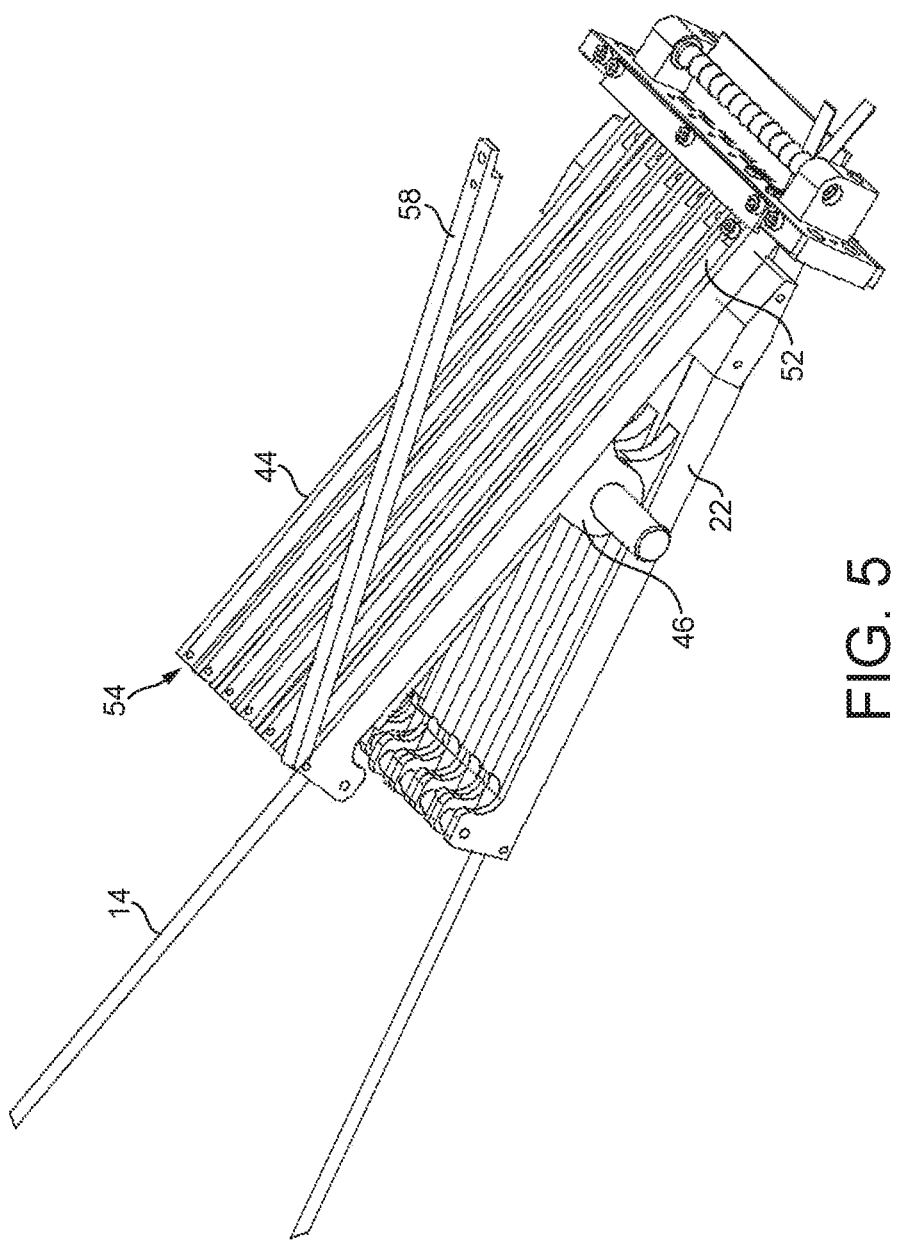
FIG. 5 is a perspective view of the cutting mechanism of FIG. 2 with a removable guide channel cover in an open position.
Figure 6:
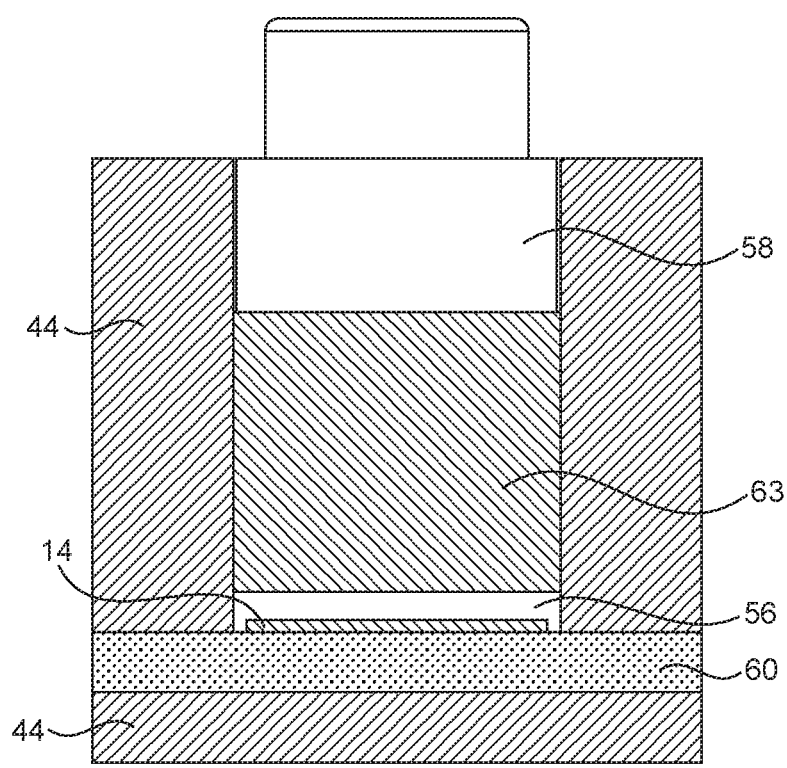
FIG. 6 is an end view of an elongate arm of the cutting mechanism of FIG. 2.

The channel section profile of each elongate arm forms a guide channel 52 having a proximal guide channel inlet 54 (FIG. 5) and a distal guide channel outlet 56 (FIG. 6). The elongate arms 44 are arranged such that the lateral positions of the guide channel inlets 54 correspond to the positions of the feed channel outlets 33 (FIG. 2) of the support head 20. There is only a short distance of longitudinal separation between the feed channel outlets 33 and the guide channel inlets 54 such that unsupported sections of the tows 14 are minimised. The guide channel 52 is provided with a removable cover 58 such that the channel 52 is enclosed in use (FIG. 5). The removable cover 58 is pivotable at its proximal end such that the guide channel 52 can be accessed, for example for maintenance.

Figure 7:
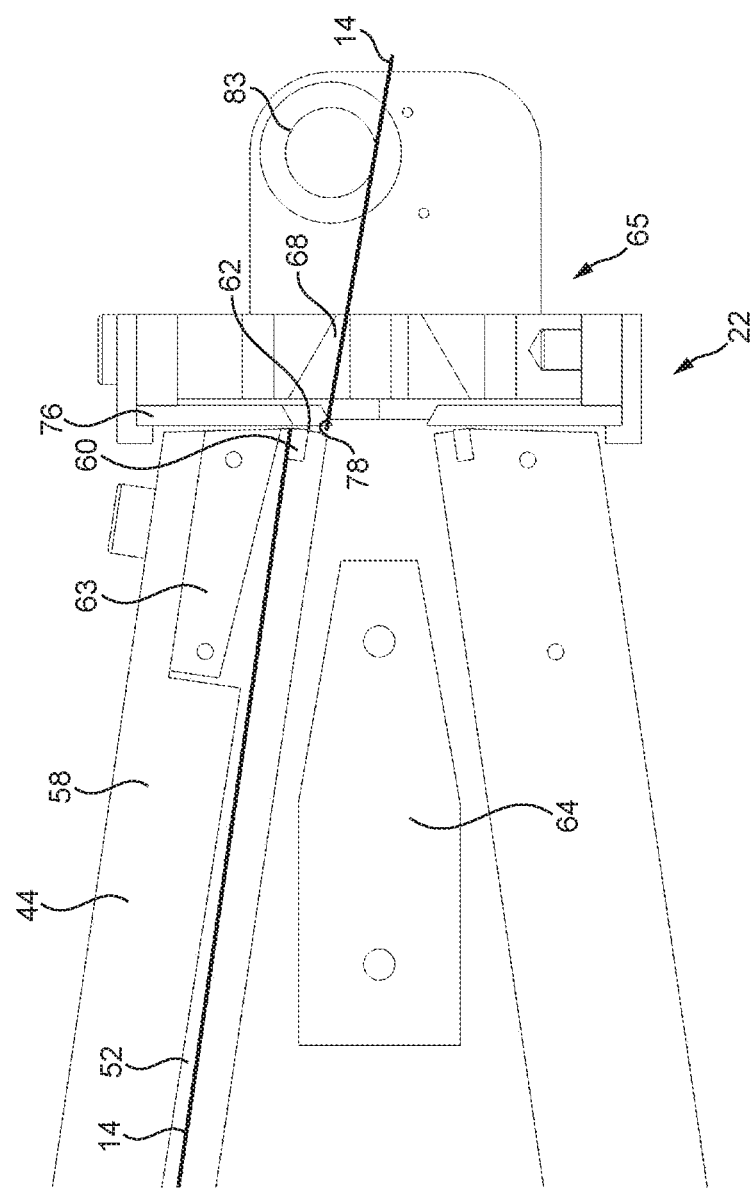
FIG. 7 is a cross-sectional side view of the cutting mechanism of FIG. 2 having cut a length of elongate fibre reinforcement material.

As shown in FIG. 6, a cutting element 60 is attached to the distal end of each elongate arm 44. The cutting element 60 comprises a hardened material. In this embodiment, each elongate arm 44 has a slot for receiving the cutting element 60 such that the outer surface of the cutting element 60 lies flush with the inner wall of the guide channel 52, and such that a sharp cutting edge 62 of the cutting element 60 forms the lip of the guide channel 52 at the guide channel outlet 56. The cutting element 60 is substantially cuboid in shape, but has a tapered distal end face adjacent the cutting edge 62 that tapers away from the cutting edge 62 in a direction towards the support head 20, such that the cutting edge 62 is the most distal part of the cutting element during a cutting stroke (as shown in FIG. 7). Similarly, the end face of the elongate arm 44 is tapered away from the cutting edge 62 in a direction towards the support head 20.

FIG. 7 shows the elongate arm 44 and further components of the cutting mechanism 22 in cross-sectional side view. A guide channel insert 63 is disposed in the distal end of each guide channel 52 and secured between the two-side walls of the U-shaped guide channel 52 such that the guide channel outlet 56 is in the form of a slot. The insert 63 defines the edge of the guide channel outlet 56 opposite the cutting edge 62 of the cutting element 60. In use, the removable cover 58 is secured to the insert 63 by a bolt. FIG. 7 also shows a stop 64 which is arranged to contact the inner surfaces of the ends of the elongate arms 44 when they are rotated inwardly, and which prevents further rotation beyond this stopped position. The stop 64 is mounted between the triangular side plates 28 of the support head 20.

Referring now to FIGS. 8 to 11, the cutting mechanism 22 further comprises a cassette 65 which is removably mounted to the distal ends of the two triangular side plates 28. The cassette 65 comprises a cassette plate 66 in which two rows of exit ducts 68 are formed, each duct 68 having a duct inlet 70 and a duct outlet 72 through which the tow 14 passes. The ducts 68 are arranged such that their lateral positions correspond to the positions of the respective guide channel outlets 56, and are provided to guide the tows 14 away from the cutting mechanism after a cut is performed (as will be described below).

The duct outlets 72 are smaller than the duct inlets 70 such that the exit ducts 68 have a tapered profile which tapers along the application direction. The duct outlets 72 are not narrower than the duct inlets 70 (i.e. in a generally lateral direction parallel with the pivot axis A), but have a smaller depth (i.e. in a direction perpendicular to the pivot axis A and the application direction).

Blade recesses 74 are formed in the inner surface of the cassette plate 66 at positions extending over the exit duct inlets 70, such that the exit ducts 68 extend from these recesses 74 through to the outer surface of the cassette plate 66. Each blade recess 74 is arranged to receive a counteracting element 76 in the form of a blade such that the cutting edge 78 of the counteracting element 76 is disposed immediately adjacent to the respective exit duct inlet 70. In this embodiment, six counteracting elements 76 are removably attached to each of an upper and a lower blade holder 80, which serve as a support strip to which the counteracting elements (e.g., blades) 76 can be removably mounted, and which can themselves be removably mounted to the upper and lower surfaces of the cassette plate 66 respectively.

Figure 8:
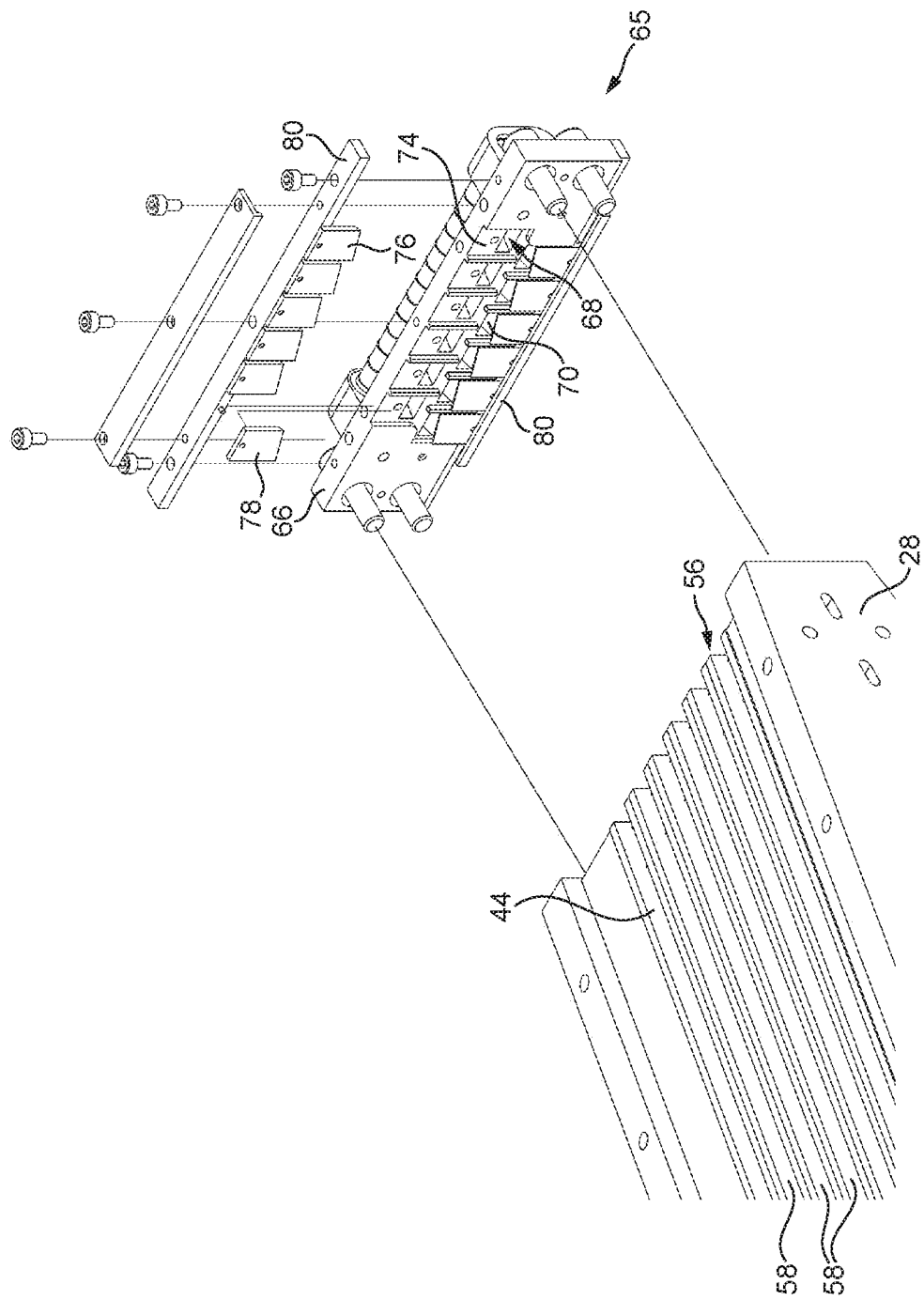
FIG. 8 is an exploded perspective view of the end of the cutting mechanism of FIG. 2 including a removable cassette.

As shown in FIG. 8, the upper row of exit ducts 68 are provided with downwardly projecting counteracting elements 76 and the lower row of exit ducts 68 are provided with upwardly projecting counteracting elements 76. The counteracting elements 76 are inclined to the generally lateral direction defined by the pivot axis A such that in a cutting stroke the tow 14 is cut progressively from one side to the other in a scissor action. The cutting element 60 is composed of a harder material than the counteracting element 76 such that over time the counteracting element 76, which is easily replaceable, is worn down in preference to the cutting element 60.

Figure 9:
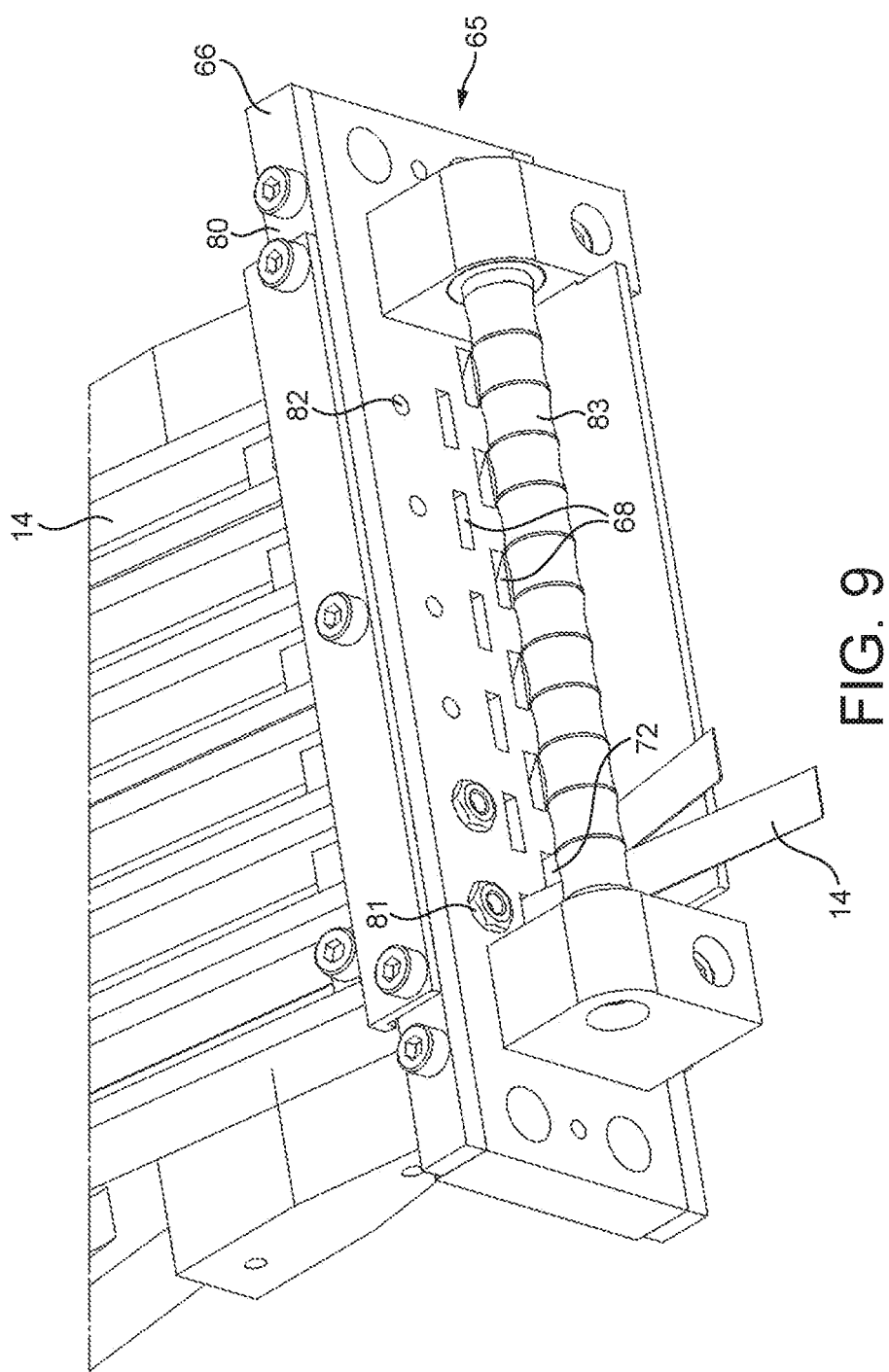
FIG. 9 shows the tip region of the cutting mechanism of FIG. 2 with lengths of fibre reinforcement material passing out of the cassette.

As shown in FIG. 9, an exit guide roller 83 is mounted to the outer surface of the cassette plate 66 and is arranged to support the tows 14 as they exit the exit ducts 68 and turn towards the applicator roller 24. FIG. 9 also shows that the exit ducts 68 of the upper and lower rows are laterally offset from each other such that the tows 14 exiting the cassette 65 are drawn onto the exit guide roller 83 alternately from the two rows. Correspondingly, the elongate arms 44 and feed channels 32 of the upper and lower rows of the cutting mechanism and support head 20 are also laterally offset with respect to each other, as described above.

Figure 10:
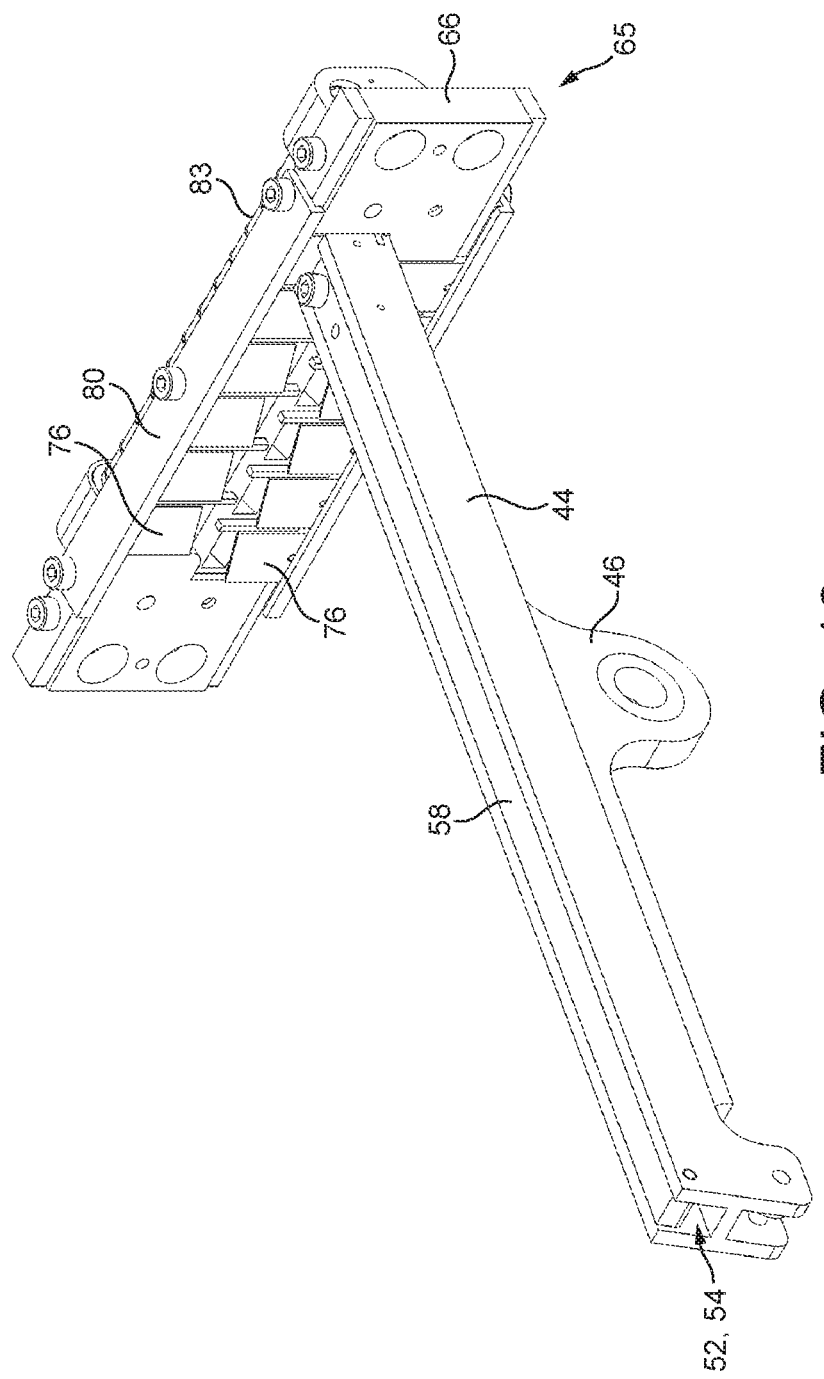
FIG. 10 shows a single elongate arm of the cutting mechanism of FIG. 2 together with the cassette.

FIG. 10 shows a single elongate arm 44 together with the cassette 65. As described above, the elongate arm 44 and cassette 65 are arranged such that the guide channel outlet 56 of the guide channel 58 is laterally aligned with an exit duct inlet 70 of the cassette 65. Correspondingly, the cutting element 60 is laterally aligned with the counteracting element 76 disposed immediately adjacent to the duct 68. The cutting element 60 and the counteracting element 76 are configured to define a nip between them, i.e. the space between the cutting element 60 and the counteracting element 76 through which material to be cut is able to pass and which closes as the material is cut in a cutting stroke. Specifically, the cutting edge 62 of the cutting element is arranged to follow an arcuate path about the pivot axis A as the elongate arm 44 is pivoted in a cutting stroke. The cutting edge 78 of the counteracting element 76 remains fixed relative the pivot axis A and the support head 20 during a cutting stroke. The cutting element 60 and the counteracting element 76 are arranged such that the cutting edge 78 of the counteracting element 76 touches the arcuate path of the cutting edge 62 of the cutting element 60. In other words, the arcuate path followed by the cutting edge 62 of the cutting element defines an imaginary surface on which a line defined by the cutting edge 78 of the counteracting element 76 lies.

Figure 11:
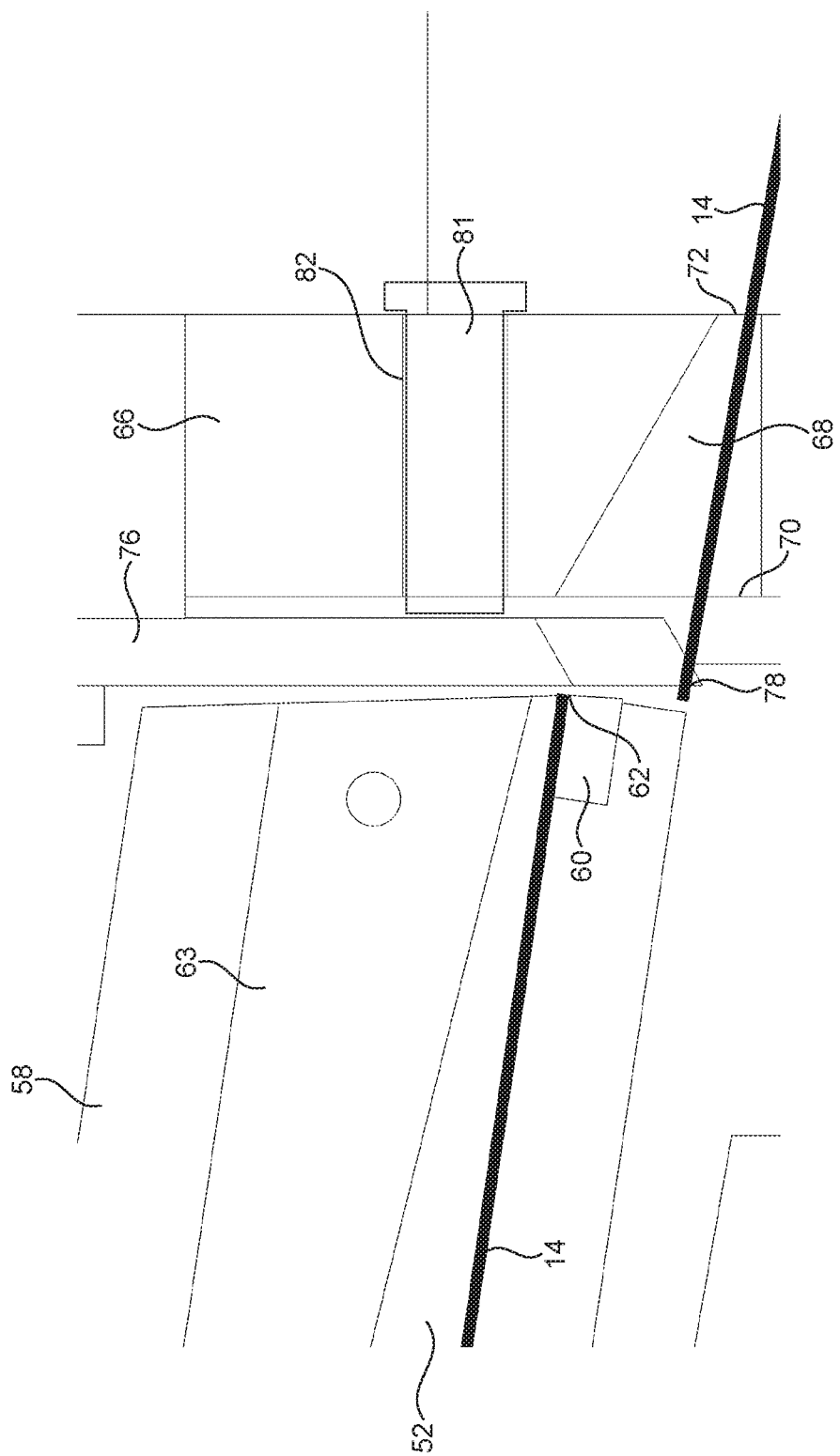
FIG. 11 is an enlarged view of a cutting element and a counteracting element of the cutting mechanism shown in FIG. 7.

Accordingly, the elongate arm 44 is arranged to be pivoted between an open position in which the tow 14 can pass from the guide channel 52 and into the exit duct 68 without being cut by the cutting element 60 and/or the counteracting element 76, and a cut position in which the cutting edges 62, 78 of the cutting element 60 and the counteracting element 76 have passed each other so as to cut the tow 14 by a shearing, or scissoring, action, as shown in FIG. 11. In this embodiment, the distal end of the elongate arm 44 moves outwardly from an open position to a cut position.

FIG. 11 shows the tip region 26 of the machine 10 in cross section, including the distal end of an elongate arm 44 and the cassette 65. A fibre composite tow 14 is shown within the guide channel 52 of the elongate arm 44. The elongate arm 44 is in a cut position in which the cutting edge 62 of the cutting element 60 has moved outwardly along an arcuate path past the cutting edge 78 of the counteracting element 76 to cut the fibre composite tow 14 in a cutting stroke by shearing. The distal portion of the cut tow 14 extends from the counteracting element 76 through the exit duct 68 and onto the exit guide roller 83.

FIG. 11 also shows an adjustment screw 81 located within a tapped through-hole 82 in the cassette plate 66 adjacent to a counteracting element 76. The adjustment screw 81 can be screwed through the through-hole 82 until it touches the counteracting element 76 in its un-deflected position. The adjustment screw 81 may then be turned further to resiliently deflect the cutting edge of the counteracting element 76 to a deflected position, and may be screwed and unscrewed so as to fine-tune the alignment of the cutting edges of the cutting element 60 and the counteracting element 76. Since the counteracting element 76 is resilient, it will return to its un-deflected position as the adjustment screw 81 is unscrewed. This provides an adjustment means for adjusting the counteracting elements 76. As opposed to using an adjustment screw 81, in other embodiments the adjustment means may comprise one or more springs which provide a force deflecting the counteracting element 76 towards the cutting element 60.

Figure 12:
FIG. 12 is a perspective view of a part of the support head of FIG. 2 together with a part of the cutting mechanism.

Referring now to FIG. 12, the actuators 84, 85 are arranged to move the cutting elements 60 through a cutting stroke by acting on the elongate arms 44 via a mechanical linkage. Although FIG. 12 only shows actuators 84, 85 for the lower row of elongate arms 44, it will be appreciated that a corresponding set of actuators 84, 85 are provided for the upper row of elongate arms 44. The actuators may be of any suitable form, for example electromagnetic, pneumatic or hydraulic actuators.

Each linear actuator 84, 85 comprises a base element 86 pivotably mounted to the inner side of the respective feed plate 30 of the support head 20 at the actuator mounting point 40, 41, and a driven element 88 connected to the base element 86 by a drive rod 90 and linearly moveable with respect to the base element 86. The cutting mechanism 22 is arranged to transmit the linear movement of the driven element 88 into pivoting movement of the elongate arm 44 (and so the cutting element 60) by way of a mechanical linkage comprising a bell crank 92. The bell crank 92 is a substantially triangular element having three pivotable attachment points. The bell crank 92 is pivotably attached to the support head 20 at a first attachment point and to the driven element 88 of the actuator 84 and the proximal end of the elongate arm 44 at second and third pivotable attachment points respectively. The bell crank 92 therefore has two substantially perpendicular arms to which the driven element 88 and the elongate member 44 are attached respectively. The attachments are relatively positioned such that these arms are of different lengths. Specifically, the driven element 88 acts on the bell crank 92 through a moment arm larger than that by which the bell crank 92 acts on the elongate arm 44, such that the linear motion of the driven element 88 is translated to pivoting movement of the elongate arm 44 with a mechanical advantage. The mechanical advantage results in the force applied to the elongate arm 44 by the bell crank 92 being greater than the force applied to the bell crank 92 by the actuation device 84 (a mechanical advantage greater than one).

As described above, the actuator mounting points 40, 41 on the support head are provided over two rows such that the actuators 84 attached thereto are staggered. This arrangement is clearly shown in FIG. 12, and requires longer drive rods 90 for the actuators 85 mounted to the proximal row of actuator mounting points 41. These longer drive rods 90 are sufficiently thin to pass between the adjacent actuators 84 mounted to the distal row of actuator mounting points 40. This staggered arrangement allows the relatively bulky actuators 84 to be provided in a relatively narrow space.

In use, the manipulation device 18 moves the support head 20, which carries the cutting mechanism 22, relative to the workpiece 12 such that tows 14 fed through the support head 20 and cutting mechanism 22 to the applicator roller 24 are applied to the surface of the workpiece 12 as part of an automatically controlled lay-up procedure. In this embodiment, the manipulation device 18 is capable of moving the support head 20 forward and back, an up and down, and the workpiece 12 can be moved side-to-side, and rotate about three mutually perpendicular axes. This provides six degrees of freedom.

As a tow 14 is fed continuously through the cutting mechanism 22, the respective elongate arm 44 is in an open position in which the tow 14 is able to pass from the guide channel outlet 56 through the duct 68 without being cut by the cutting element 60 or the counteracting element 76, as described above.

At appropriate stages of the lay-up procedure, the machine 10 will determine that a fibre composite tow 14 is to be cut. The machine 10 is operable to cut each tow 14 individually, sequentially or simultaneously. Once it is determined that a particular fibre composite tow 14 is to be cut, the machine 10 activates the respective actuator 84, 85 associated with the respective elongate arm 44 which conveys the tow 14 to a respective nip such that the actuator 84, 85 draws the driven element 88 towards the base element 86. This movement causes the bell crank 92 to pivot relative the support head 20, which in turn causes the proximal end of the elongate arm 44 to move inwardly about the pivot axis A. Due to the different arm lengths of the bell crank 92, the bell crank 92 has a mechanical advantage which results in the rotational force applied to the elongate arm 44 being greater than that applied to the bell crank by the actuator 84, albeit for a smaller displacement (arc length) of the proximal end of the elongate arm 44.

The pivoting movement of the actuator 84 therefore causes the distal end of the elongate arm 44 to pivot outwardly, such that the cutting edge 62 of the cutting element 60 cooperates with the cutting edge 78 of the counteracting element 76 in a cutting stroke which severs the tow 14 lying in the nip between them in a scissor-like shearing action.

Since the pivot axis A is closer to the distal end than the proximal of the elongate arm 44, the elongate arm 44 has a mechanical advantage which results in the force applied to the cutting element 60 at the distal end of the elongate arm 44 during the cutting stroke being greater than the force applied to the proximal end of the elongate arm 44 by the bell crank 92, albeit for a smaller displacement (arc length) of the distal end of the elongate arm 44 compared to the proximal end of the elongate arm 44.

Following the cutting stroke, the distal portion of the cut tow 14 may be drawn away from the nip by subsequent motion of the support head 20 over the workpiece 12, guided by the exit guide roller 83 and the applicator roller 24. The respective actuator 84, 85 is then controlled to move the driven element 88 away from the base element 86, reversing the pivoting motion of the elongate arm 44 and restoring the arm 44 to an open position in which the inner surface of the distal end of the elongate arm 44 rests on the stop 64.

The machine 10 may then control the feed rollers 38 to feed the composite tow 14 through the nip once more.

In this embodiment, each fibre composite tow 14 fed through the machine 10 is associated with an elongate arm 44 coupled to a respective actuation device 84, 85. In order to sever a particular tow 14, the respective actuator 84, 85 is activated. However, in other embodiments two or more elongate arms 44 may be coupled to a single actuator 84 such that the single actuator 84 cuts two or more tows 14 simultaneously.

In this embodiment, the manipulation device 18 will stop movement of the support head 20 and cutting mechanism 22 relative to the workpiece 12 when the tow 14 is to be cut, although it will be appreciated that in other embodiments the arm 18 may continue to move.

As described above, placing the actuation devices away from the tip region allows the tip region to be compact. This has the benefit of enabling the tip region of the machine to avoid collisions with the workpiece in a lay-up process for a complex geometry workpiece, such as a workpiece having regions of high curvature, narrow recesses and other hard-to-reach areas. The compact tip region allows the cutting element and counteracting element (i.e. the cutting location) to be near to the applicator roller, which may enable a shorter minimum tow length than previously achievable.

The mechanical advantage of the bell crank and the elongate arm, has the effect that a high cutting force can be achieved between the cutting element and the counteracting element during a cutting stroke whilst a lower force is applied at the actuator. The mechanical advantage of the mechanical linkage may therefore reduce the need for bulky actuators with high force ratings.

The removable cassette allows for easy maintenance and replacement of the cutting parts. The cassette can be swiftly removed and the counteracting elements replaced, either individually, as an entire row of counteracting elements mounted on a countering element holder, or alternatively the entire cassette itself could be replaced. Further, the cassette allows the cutting elements coupled to the elongate arms to be easily accessed and replaced, if necessary. Accordingly, the removable cassette allows rapid maintenance with minimal equipment downtime.

Although embodiments of the invention have been described by reference to pre-impregnated fibre composite tows, it will be appreciated that the invention is equally applicable to the application and cutting of other forms of fibre composite and/or fibre reinforcement material. For example, the invention is equally applicable to the application and cutting of fibre composite or fibre reinforcement material tape. The tape may comprise unidirectional carbon fibre, and may or may not be pre-impregnated with matrix material. Further, it will be appreciated that in the foregoing description, the term "tow" is equally applicable to a plurality of individual strands of dry fibre reinforcement/fibre composite material and to a narrow tape of fibre reinforcement/fibre composite material.

For the avoidance of doubt, the expression "composite material" is intended to cover both reinforcement material for use in making a composite component (e.g. dry composite fibres), and composite material comprising both reinforcement material and matrix material.

Although embodiments of the invention have been described in which the support head moves forwards and backwards, and up and down, and the workpiece moves side-to-side and rotationally about three axes, it will be appreciated that in other embodiments the support head and workpiece may be capable of other movements. For example, the workpiece may be capable of moving forwards and backwards, and side-to-side, whilst the support head may be capable of moving up and down, and rotationally about three mutually perpendicular axes. This arrangement would also provide six degrees of freedom. Of course, it is possible that less or more than six degrees of freedom are provided. The workpiece may comprise a mandrel or it may be mounted on a mandrel.

Further, although the invention has been described in the context of an Automatic Fibre Placement (AFP) process, it will be appreciated that the invention is equally applicable to other composite lay-up processes including Automatic Tape Laying (ATL) and automatic fibre winding.

Although the embodiments of the invention which have been described comprise substantially linearly extending elongate arms, it will be appreciated that in other embodiments the elongate arms may be curved or otherwise non-linear, whilst still extending in a plane perpendicular to the pivot axis. In some embodiments it may be possible to integrally form the or each bell crank with the respective elongate arm.

Although the embodiments of the invention which have been described comprise a single pivot axle and a single corresponding pivot axis, it will be appreciated that in other embodiments there may be a plurality of pivot axes. For example, there may be a separate pivot axle for each row of side-by-side elongate arms. Further, a subset of the elongate arms or individual elongate arms may have their own pivot axis. Pivot axes could be longitudinally separated from each other and/or may be above and below one another (i.e. parallel but separated in a direction perpendicular to a pivot axis and the generally longitudinal application direction).

In the above description, the generally longitudinally extending application direction relates to the overall proximal to distal or back-to-front direction of the support head and cutting mechanism. It is referred to as the application direction because in the embodiments described it is generally the direction along which fibre reinforcement material is fed through the support head and cutting mechanism to be applied to a workpiece. The pivot axis defines a direction referred to for convenience as generally horizontal or lateral, although it is not necessary for the machine to be oriented in use such that the pivot axis remains horizontal. Similarly, references such as "vertical" "upper" and "lower" and the like relate to a direction perpendicular to the pivot axis and the application direction. Again, it is not necessary for the machine to be oriented in use such that "upper" components are always above "lower" components, since the support head and cutting mechanism may be rotated to adopt any configuration. The terminology employed reflects the position of the equipment shown in FIG. 2 and is intended to establish a useful frame of reference in the foregoing description.

Although it has been described that the cutting edge of the counteracting element lies on or touches an imaginary cylindrical surface defined by the arcuate movement of the cutting edge of the cutting element, it will be appreciated that this alignment need not be exact. In particular, it will be appreciated that where the counteracting element is a planar blade and the cutting edge of the counteracting element is inclined it may not precisely lie on or touch the imaginary cylindrical surface.

The radius of the arcuate path followed by the cutting edge of the cutting element depends on the distance between the cutting edge and the pivot axis. In most embodiments, this radius will be significantly larger than the arc length of a cutting stroke, and therefore the arcuate movement of the cutting edge of the cutting element may be approximated as linear movement.

Although embodiments of the invention have been described in which the fibre composite material is cut by a shearing action, it will be appreciated that in other embodiments, the cutting mechanism may be arranged to cut the fibre composite material by another cutting process, for example by anvil cutting in which a straight cutting element bears down on an anvil to cut material disposed between them.

REFERENCE NUMERALS

Composite material lay-up machine 10
Composite material workpiece 12
Fibre composite material 14
Manipulation device 18
Support head 20
Cutting mechanism 22
Applicator roller 24
Tip region 26
Triangular side plates 28
Feed plates 30
Feed channels in feed plates 32
Feed channel outlet 33
Outer cover plate 34
Redirecting rollers 36
Feed rollers 38
Actuator mounting points (first row) 40
Actuator mounting points (second row) 41
Pivot axle 42
Elongate arm 44
Pivot attachment of elongate arm 46
Upper row of elongate arms 48
Lower row of elongate arms 50
Guide channel in elongate arm 52
Guide channel inlet 54
Guide channel outlet 56
Removable cover of guide channel 58
Cutting element 60
Cutting edge of cutting element 62
Guide channel insert 63
Stop 64
Cassette 65
Cassette plate 66
Exit duct 68
Exit duct inlet 70
Exit duct outlet 72
Blade recess 74
Counteracting element (or counteracting element) 76
Cutting edge of the counteracting element 78
Counteracting element holder 80
Adjustment screw 81
Tapped through-hole 82
Exit guide roller 83
Actuator (first row) 84
Actuator (second row) 85
Base element of an actuator 86
Driven element of an actuator 88
Drive rod of an actuator 90
Bell crank 92

We claim:

1. A cutting mechanism for severing elongate fibre reinforcement material in composite material lay-up equipment, the cutting mechanism comprising:
  a cutting element and a counteracting element which cooperate to sever fibre reinforcement material extending through a nip between the cutting element and the counteracting element in a tip region of the cutting mechanism;

linearly extending elongate arm to which the cutting element is fixed at a distal end of the elongate arm, wherein the elongate arm is directly coupled to and pivotable about a fixed pivot axis spaced from the nip to displace the cutting element relatively to the counteracting element to perform a cutting stroke, the cutting element being mounted to the elongate arm; and an actuation device disposed in an actuation region of the cutting mechanism, the actuation device being configured to act on the elongate arm at a position away from the cutting element to move the cutting element in the cutting stroke, wherein the cutting mechanism extends in a generally longitudinal application direction, and wherein the actuation region is longitudinally spaced from the tip region.

2. A cutting mechanism according to claim 1, wherein a cross-sectional profile of the cutting mechanism in a plane normal to the application direction is smaller at the tip region than at the actuation region.

3. A cutting mechanism according to claim 1, wherein the cutting mechanism has a tapered profile which converges towards the tip region.

4. A cutting mechanism according to claim 1, wherein the pivot axis extends in a direction perpendicular to the generally longitudinal application direction.

5. A cutting mechanism according to claim 1, further comprising a guide means arranged to guide the fibre reinforcement material through the nip in a feed direction.

6. A cutting mechanism according to claim 1, wherein the cutting element is one of a plurality of cutting elements disposed in an array, each cutting element cooperating with the counteracting element or with one of a plurality of counteracting elements to sever a respective length of fibre reinforcement material extending through a respective nip between the cutting element and the respective counteracting element, each cutting element being mounted on one of a corresponding plurality of elongate arms which is pivotable about a pivot axis spaced from the nip, to displace the cutting element relatively to the respective counteracting element to perform a cutting stroke; and wherein the cutting mechanism further comprises a plurality of actuation devices for driving the elongate arms in respective cutting strokes, each of the actuation devices acting on the elongate arms at positions away from the respective cutting elements.

7. Composite material lay-up equipment comprising:
a support head; and
a cutting mechanism for severing elongate fibre reinforcement material comprising:
a cutting element and a counteracting element which cooperate to sever fibre reinforcement material extending through a nip between the cutting element and the counteracting element in a tip region of the cutting mechanism;

linearly extending elongate arm to which the cutting element is fixed at a distal end of the elongate arm, wherein the elongate arm is directly coupled to and pivotable about a fixed pivot axis spaced from the nip to displace the cutting element relatively to the counteracting element to perform a cutting stroke, the cutting element being mounted to the elongate arm; and an actuation device disposed in an actuation region of the cutting mechanism, the actuation device being configured to act on the elongate arm at a position away from the cutting element to move the cutting element in the cutting stroke, wherein the cutting mechanism extends in a generally longitudinal application direction, and wherein the actuation region is longitudinally spaced from the tip region;

wherein the support head carries the cutting mechanism.

8. Composite material lay-up equipment according to claim 7, wherein a cross-sectional profile of the cutting mechanism in a plane normal to the application direction is smaller at the tip region than at the actuation region.

9. Composite material lay-up equipment according to claim 7, wherein the cutting mechanism has a tapered profile which converges towards the tip region.

10. Composite material lay-up equipment according to claim 7, wherein the pivot axis extends in a direction perpendicular to the generally longitudinal application direction.

11. Composite material lay-up equipment according to claim 7, further comprising a guide means arranged to guide the fibre reinforcement material through the nip in a feed direction.

12. Composite material lay-up equipment according to claim 7, wherein the cutting element is one of a plurality of cutting elements disposed in an array, each cutting element cooperating with the counteracting element or with one of a plurality of counteracting elements to sever a respective length of fibre reinforcement material extending through a respective nip between the cutting element and the respective counteracting element, each cutting element being mounted on one of a corresponding plurality of elongate arms which is pivotable about a pivot axis spaced from the nip, to displace the cutting element relatively to the respective counteracting element to perform a cutting stroke; and wherein the cutting mechanism further comprises a plurality of actuation devices for driving the elongate arms in respective cutting strokes, each of the actuation devices acting on the elongate arms at positions away from the respective cutting elements.

* * * * *